United States Patent
Allen et al.

[11] Patent Number: 6,036,469
[45] Date of Patent: Mar. 14, 2000

[54] QUICK CHANGE SYSTEM FOR INTERCHANGING MOLDS ON EXTRUSION BLOW MOLDING MACHINES

[75] Inventors: John Wade Allen, Plainville; Brooks B. Heise, Jr., Higganum, both of Conn.

[73] Assignee: Heise Industries, Inc., East Berlin, Conn.

[21] Appl. No.: 09/095,386

[22] Filed: Jun. 10, 1998

[51] Int. Cl.[7] .............................. B29C 33/30; B29C 49/50; B29C 49/56; B29C 49/64
[52] U.S. Cl. ........................ 425/192 R; 249/81; 249/102; 425/195; 425/522; 425/526; 425/527; 425/541
[58] Field of Search .................... 425/183, 522, 425/541, 532, 806, 192 R, 195, 527, 526; 249/102, 79, 81

[56] References Cited

U.S. PATENT DOCUMENTS

| | | | |
|---|---|---|---|
| 4,381,183 | 4/1983 | Bowers et al. | 425/527 |
| 4,419,063 | 12/1983 | Heise | 425/527 |
| 4,500,274 | 2/1985 | Cyriax et al. | 425/190 |
| 4,544,340 | 10/1985 | Hehl | 425/192 R |
| 4,552,526 | 11/1985 | Hafele | 425/532 |
| 4,786,244 | 11/1988 | Holzschuh | 425/192 R |
| 5,096,405 | 3/1992 | Pace et al. | 425/192 R |
| 5,114,330 | 5/1992 | Nielson | 425/195 |
| 5,474,438 | 12/1995 | Walker, Jr. | 425/525 |
| 5,551,861 | 9/1996 | Baldi | 425/527 |
| 5,562,935 | 10/1996 | Martin | 425/190 |
| 5,700,496 | 12/1997 | Bacon | 425/541 |

FOREIGN PATENT DOCUMENTS 3613543  12/1986  Germany ................ 425/541

*Primary Examiner*—Robert Davis
*Attorney, Agent, or Firm*—R. William Reinsmith; Murtha, Cullina, Richter and Pinney LLP

[57] ABSTRACT

A quick change system and method of interchanging molds on plastic extrusion blow molding machines is disclosed wherein a universal standard subplate is provided for use with different blow molding machines on which a variety of different mold units are removably mounted on the standard subplate with the subplate establishing a preselected precisely aligned relation automatically between the mold unit and a machine platen. A quick release locking device is provided between each mold unit and a unitary standard water manifold and detabber assembly. The unitary standard assembly is provided as a one-piece component with fluid connections communicating respectively with water and air supply sources of the water manifold and detabber and which are conveniently maintained attached without being disconnected during detachment of the unitary standard assembly from the mold unit during a mold change.

10 Claims, 15 Drawing Sheets

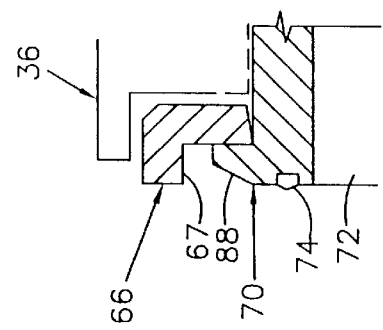
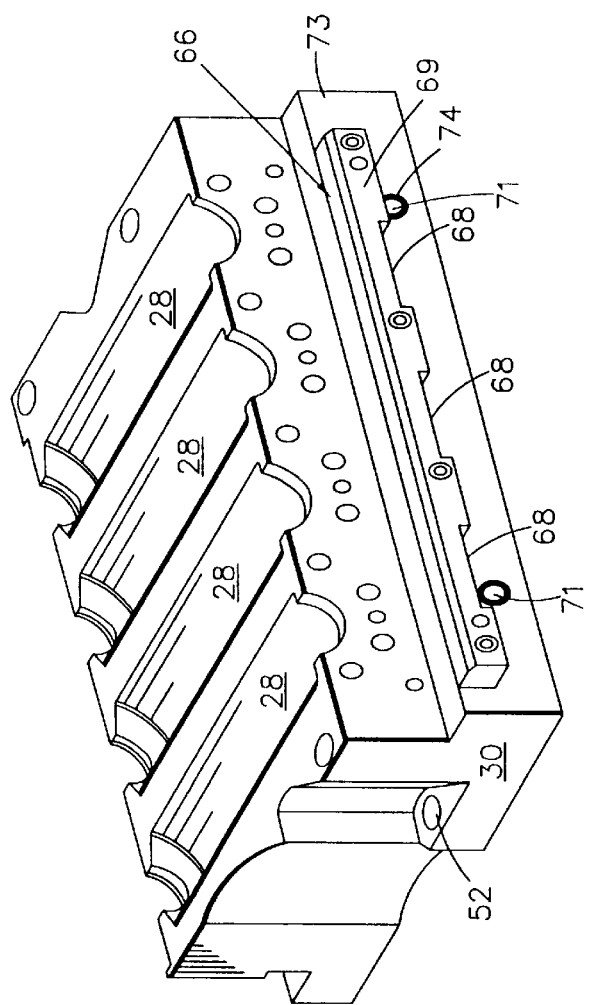
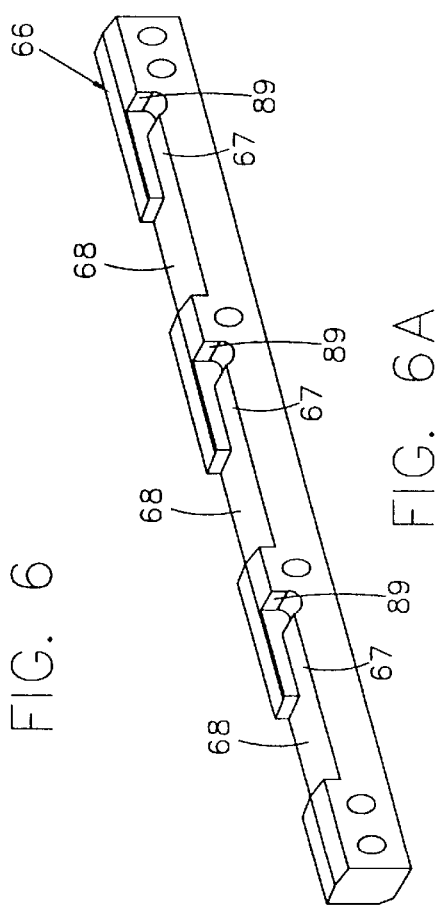

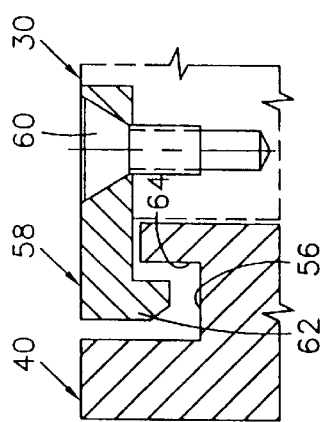
FIG. 8
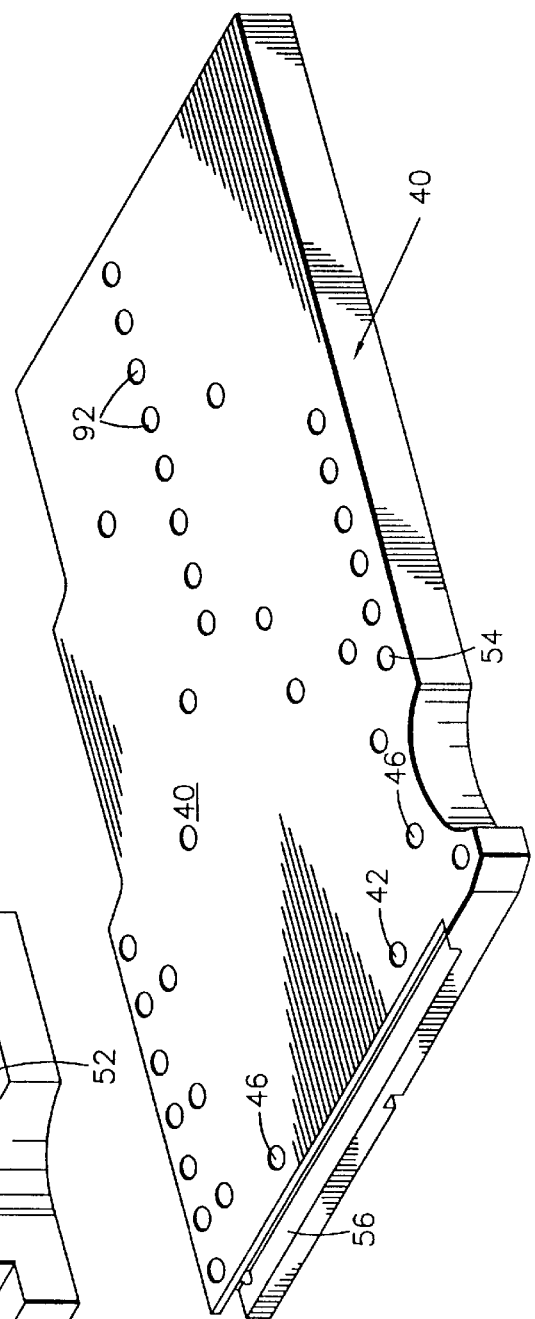
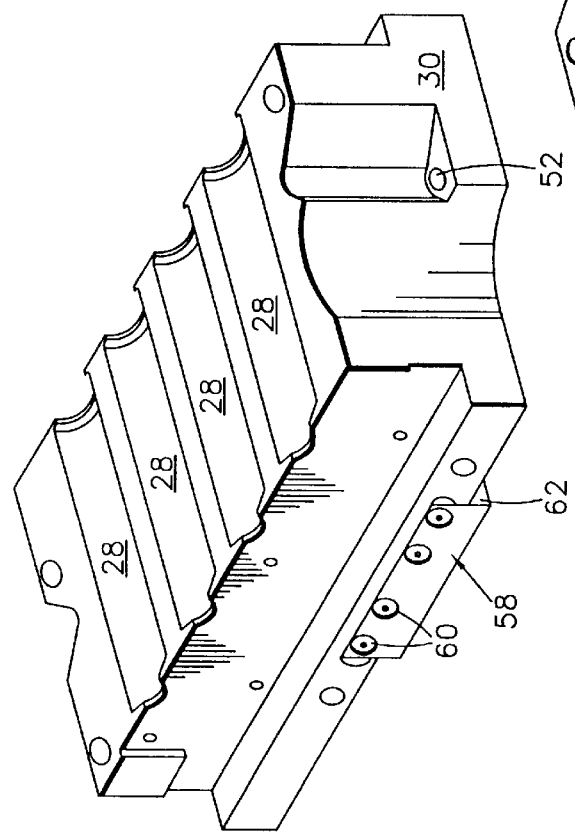
FIG. 7A

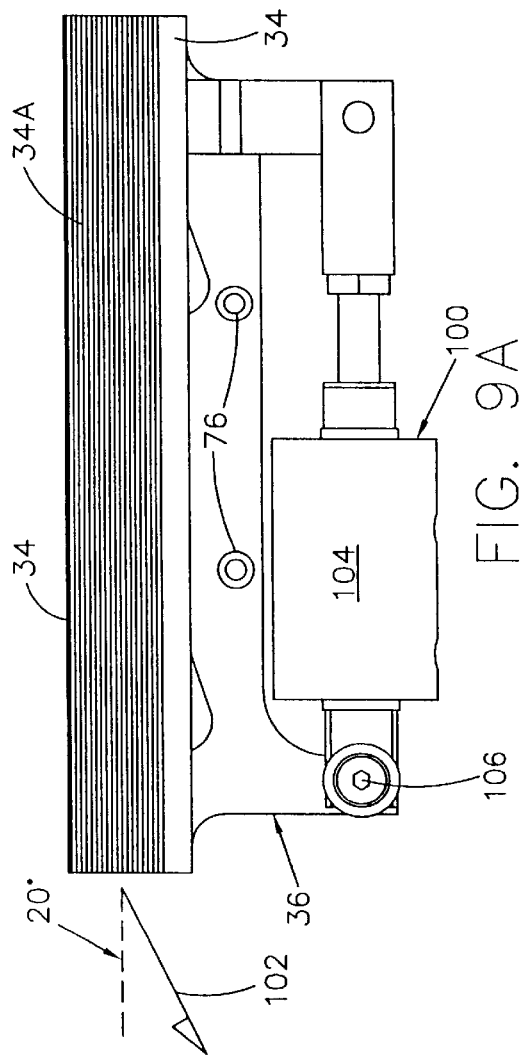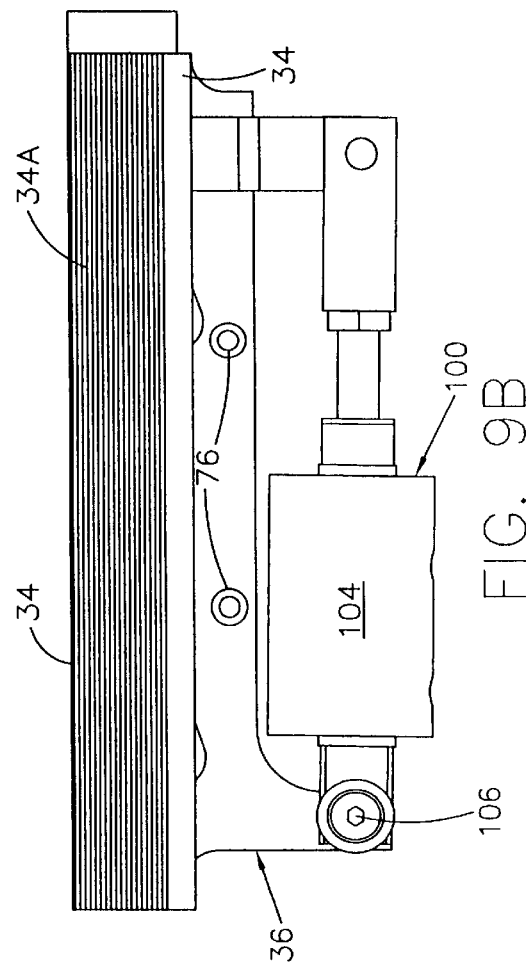

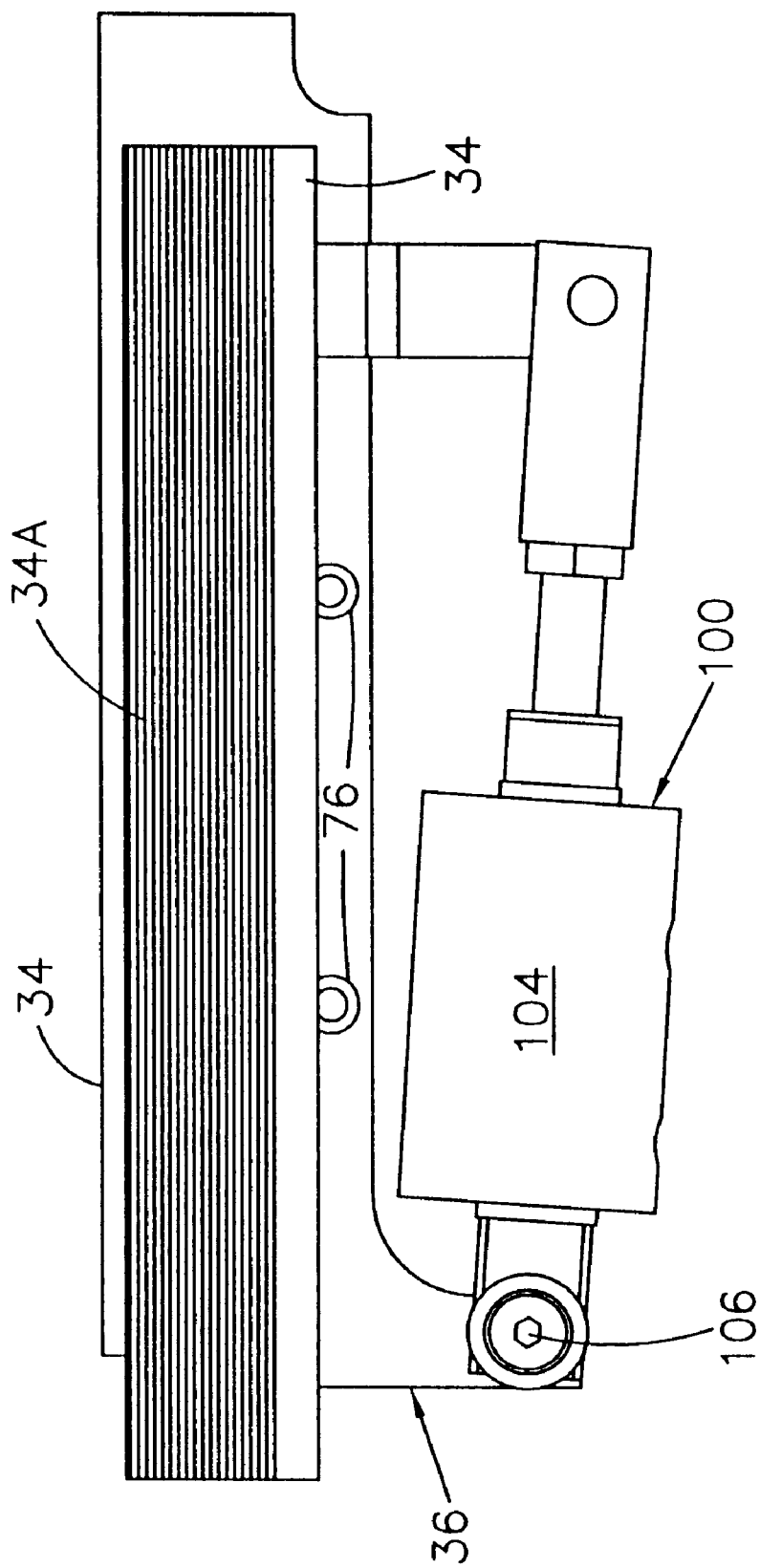

QUICK CHANGE SYSTEM FOR INTERCHANGING MOLDS ON EXTRUSION BLOW MOLDING MACHINES

FIELD OF THE INVENTION

This invention generally relates to plastic extrusion blow molding machines and particularly concerns a quick change system and method for interchanging molds on platens of different blow molding machines.

BACKGROUND OF THE INVENTION

Different molds have long been interchanged on basic plastic extrusion blow molding machines in a time consuming, laborious process. These machines are often customized and use molds which comprise an assembly of parts which normally remain together as an operative unit. That is, each time a conventional new mold is purchased, associated parts such as a back plate and a water manifold for supplying coolant water are provided for that new mold so as to permit the parts to be installed and later removed as an operative unit. Another part required for that new mold is a detabber. As is well known to those skilled in the art, in such blow molding machines, a tab of plastic (attached to a base of a blow molded object such as a container) is formed and must be removed prior to completion of the molding process. A detabber having a stripper bar which has been previously used with success is shown in U.S. Pat. No. 4,419,063 assigned to the assignee of this invention. The stripper bar is power operated to pivot against a mating fixed stripper plate for removing the tab from the molded object.

A series of heretofore unsolved problems are associated with the changing of a mold in a plastic extrusion blow molding machine. These problems involve the disassembly of water hoses from their connection on a side of the back plate and the disassembly of air feed hoses to the detabber, in addition to the removal of operative parts from the extrusion blow molding machine whereby the highly labor intensive, critical alignment of the mold to that machine is lost. To remove one mold and attach a new mold thus may take as long as three hours in disassembly of one mold from the machine, including disconnecting the water hoses and air feed hoses for respectively delivering required water to the blow mold and motive air power to the detabber, and then aligning a new mold to the machine, and again establishing the necessary fluid connections to the water manifold and the detabber.

OBJECT OF THE INVENTION

Accordingly, an object of this invention is to provide a new and improved system and method which is particularly suited for expeditious changeover of an extrusion blow molding machine from one mold to another in a significantly reduced amount of time and which additionally provides notable cost savings in both ease of the manufacture and in minimizing the number of required operative component parts.

Other objects will be in part obvious and in part pointed out more in detail hereinafter.

SUMMARY OF THE INVENTION

This invention features a quick change system and method for interchanging molds on platens of different extrusion blow molding machines. A subplate dimensioned and configured for use with different blow molding machines serves as a universal standard component which may be permanently secured to a platen of a blow molding machine. The standard subplate has alignment means for positioning it in predetermined precision alignment with the machine platen. A plurality of different mold units are interchangeably attachable to the standard subplate. Each mold unit is mounted in a predetermined leveled and centered operating position on the standard subplate which establishes a preselected, precisely aligned relation between the installed mold unit and the machine platen. A water manifold and detabber are mountable on each of the different mold units as a unitary standard assembly with fluid connections for connecting the water manifold and the detabber respectively with water and air supply sources. During detachment of the standard assembly from a mold unit, the fluid connections between the fluid supply sources and the water manifold and detabber of the standard assembly are continuously maintained without being disconnected, thereby expediting mold change.

BRIEF DESCRIPTION OF THE DRAWINGS

FIG. 6 is an isometric view of a mold body with a locking bar fixed to and extending along a lower rear portion of the mold body;

FIG. 6A is an enlarged isometric view of the locking bar of FIG. 6 showing it in reversed relation to its position in FIG. 6 with its upper surface exposed;

FIG. 6B is a sectional view, partly broken away, taken generally along line 6B—6B of FIG. 5A;

FIGS. 7A–7C are isometric views of parts of the apparatus of FIG. 1A, namely, a half mold body and an associated universal standard subplate showing the half mold body being mounted on the universal standard subplate in a sequence of steps;

FIG. 8 is a sectional view, partly broken away, taken generally along line 8—8 of FIG. 7C; and FIGS. 9A–9C are front views of a part of a detabber showing movement of its stripper bar between an operative tab-engaging position (FIG. 9A) to a remote tab-stripped position (FIG. 9C) along a path inclined to the horizontal in a side-pull detabbing motion.

A better understanding of the objects, advantages, features, properties and relations of the invention will be obtained from the following detailed description and accompanying drawings which set forth an illustrative embodiment and is indicative of the various ways in which the principles of the invention are employed.

DETAILED DESCRIPTION OF A PREFERRED EMBODIMENT

Figure 1:
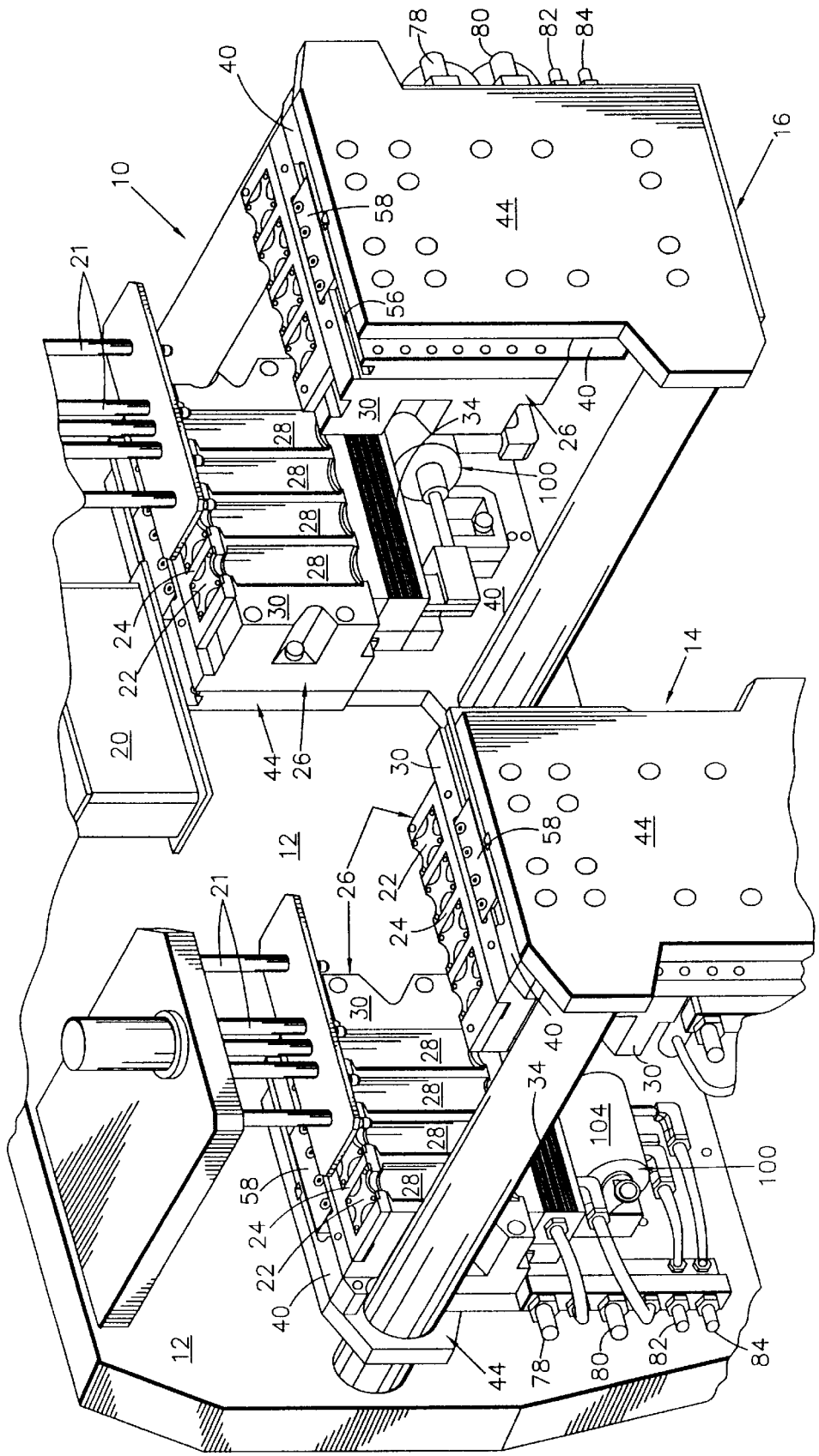
FIG. 1 is an isometric view, partly disassembled and partly broken away, showing a portion of a plastic extrusion blow molding machine incorporating this invention.
Figure 1A:
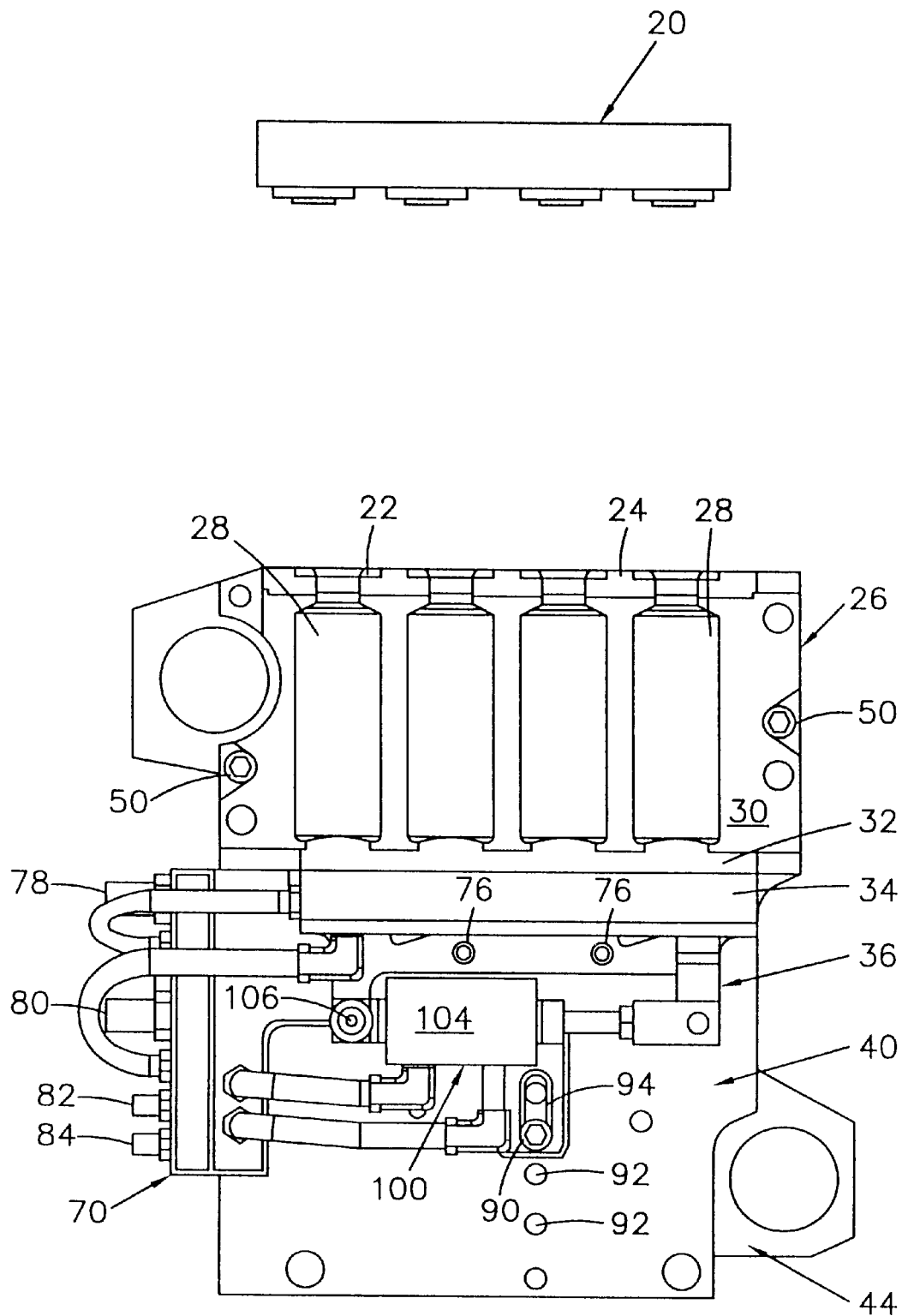
FIG. 1A is a front view of an apparatus of this invention incorporated in the machine of FIG. 1 and showing an extrusion head in disassembled relation to the apparatus.
Figure 2:
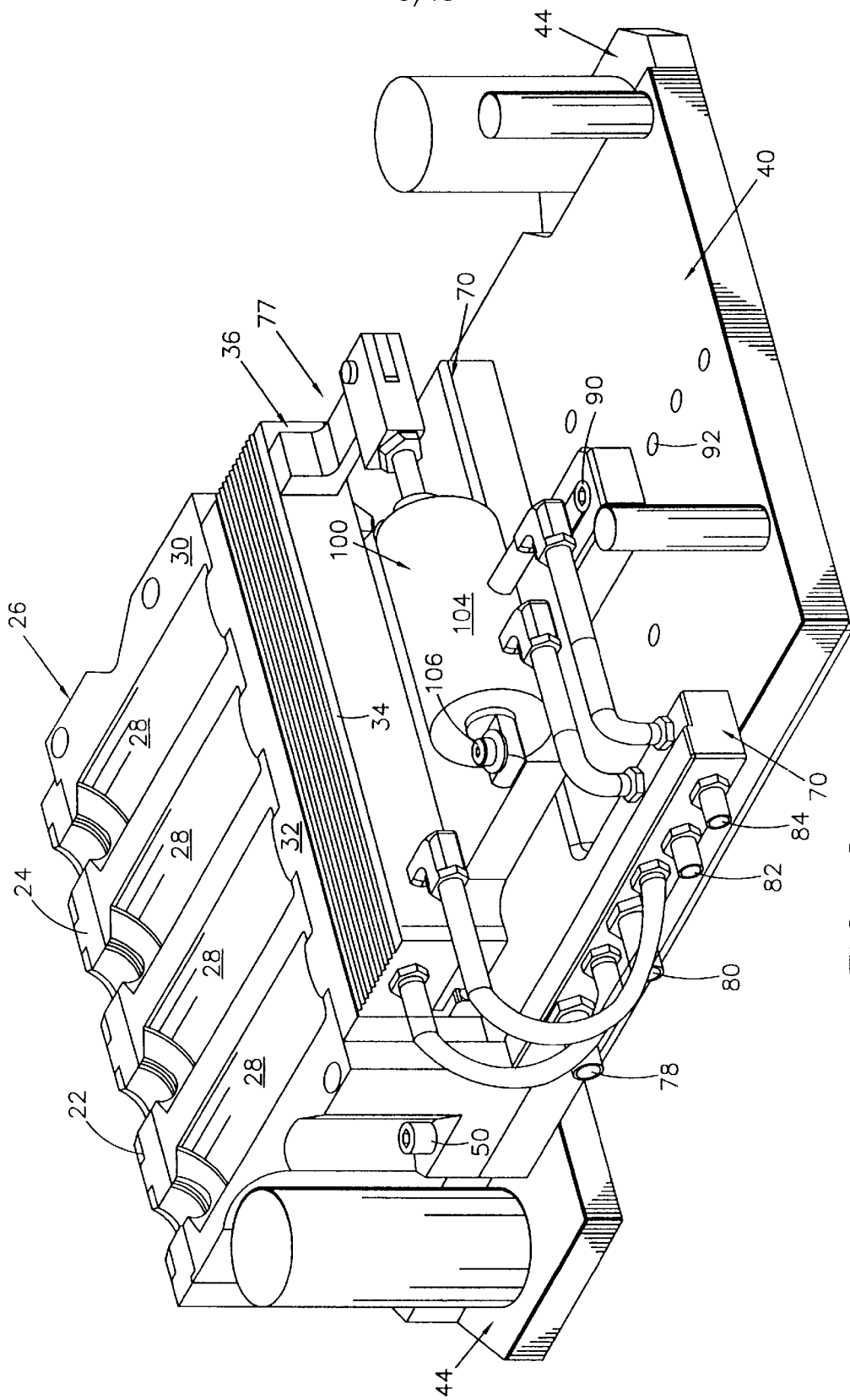
FIG. 2 is an enlarged isometric view, partly broken away, of the apparatus of FIG. 1A.

Referring to the drawings in detail, FIG. 1 shows a portion of a plastic extrusion blow molding machine 10 having a pair of mold assemblies 14, 16. A plastic extrusion head 20 extrudes plastic tubes prior to blow pins (such as at 21) engaging striker plates 22 of neck inserts 24 of a mold unit 26. Each of the assemblies 14, 16 include two mold units 26 in confronting face-to-face relation. A plurality of plastic tubes (not shown) are positioned respectively in each cavity such as at 28 formed in a mold body 30 of each mold unit 26. It is to be understood that the tubes formed by the extrusion head 20 are positioned to extend through the mold cavities of the respective halves of the mold assemblies and protrude below base inserts such as at 32 (FIG. 1A) of each mold unit 26. The tubes will be understood to extend through a so-called "pinch area" immediately below the mold cavities. As fully described in the above referenced U.S. Pat. No. 4,419,063, the subject matter of which is incorporated herein by reference, the halves of the mold unit 26 are closed and pinched to form a tab, not shown, depending from the bottom of each tube in the pinch area between the halves of the mold unit and thereafter air is forced by any suitable means, not shown, into the top of each tube to mold it into a container conforming to the shape of the cavities 28 of the mold body 30 and to cool the unit. The tabs of plastic on the container bases are maintained in position below the base inserts 32 of the mold cavities 28 in alignment with a stripper bar 34 of a detabber 36. It will suffice for an understanding of this invention to recognize that the stripper bar 34 has a serrated face 34A for gripping the tabs and is movable between an operative tab-engaging position (FIG. 9A) in closed relation to a complementary confronting fixed stripper plate, not shown, and a remote tab-stripped position (FIG. 9A), in spaced relation to the fixed stripper plate, to effect a basic detabbing or stripping action on the depending tab at the base of each molded container.

As is known to those skilled in the art, different extrusion blow molding machines have specific custom features which are different from one another. These custom features have conventionally required different mold sets to be customized accordingly to permit the mounting of those mold sets in precisely aligned relation on those machines. It is also known that normally a given mold set is provided with additional separate parts for a particular extrusion blow molding machine as part of its custom assembly which includes a back plate, which serves as a water manifold, and a detabber which are individually attachable to the machine and removed from the machine as a group of disassembled but related parts intended to be used with that particular mold set. Before the mold set may be removed from the machine, the water hoses must be disassembled from their connections on the side of the back plate and the air feed hoses which provide the motive power to the stripper bar of the detabber must be disconnected.

Thereafter, another mold set which then is to be mounted on the machine again has to be precisely aligned relative to the machine, and each of the parts associated with that mold set have to be installed, including reattachment of all fluid connections to the water manifold and detabber unit. From a practical standpoint, such mold changeovers are not easily accomplished. Mold sets are heavy. They are even heavier when formed of beryllium copper. In addition, mold sets are awkward to handle, particularly when one is trying to precisely align each mold set with the machine.

Figure 4:
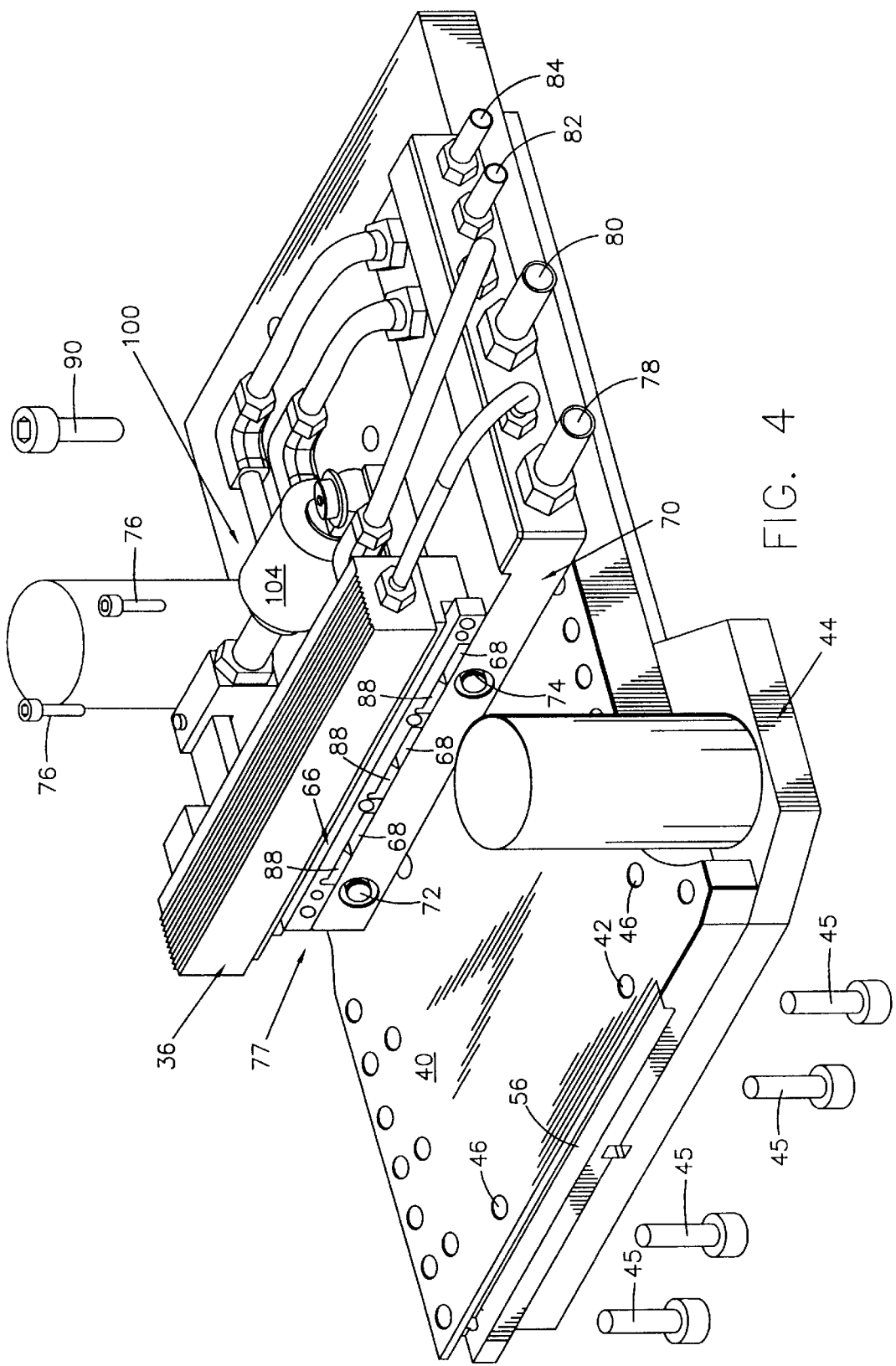
FIG. 4 is an isometric view, partly exploded and partly broken away, showing the apparatus of FIG. 1A with certain parts removed for purposes of clarity and illustrating a machine platen on which a universal standard subplate is mounted and a unitary standard water manifold and detabber assembly is shown in an operating position on the standard subplate.

To readily interchange different mold sets among different blow molding machines, a subplate 40 is disclosed in accordance with this invention which subplate is dimensioned and configured for use with different blow molding machines as a universal standard component. This standard subplate 40 has a multiplicity of openings such as at 42 which will be understood to register with corresponding openings such as at 43 on platens 44 of different blow molding machines to permit the subplate 40 to be permanently secured to a platen 44 by suitable machine fasteners 45 as shown in FIG. 4. As will be understood by those skilled in the art, the standard subplate 40 is readily modified for use with a variety of different machine platens.

Figure 3:
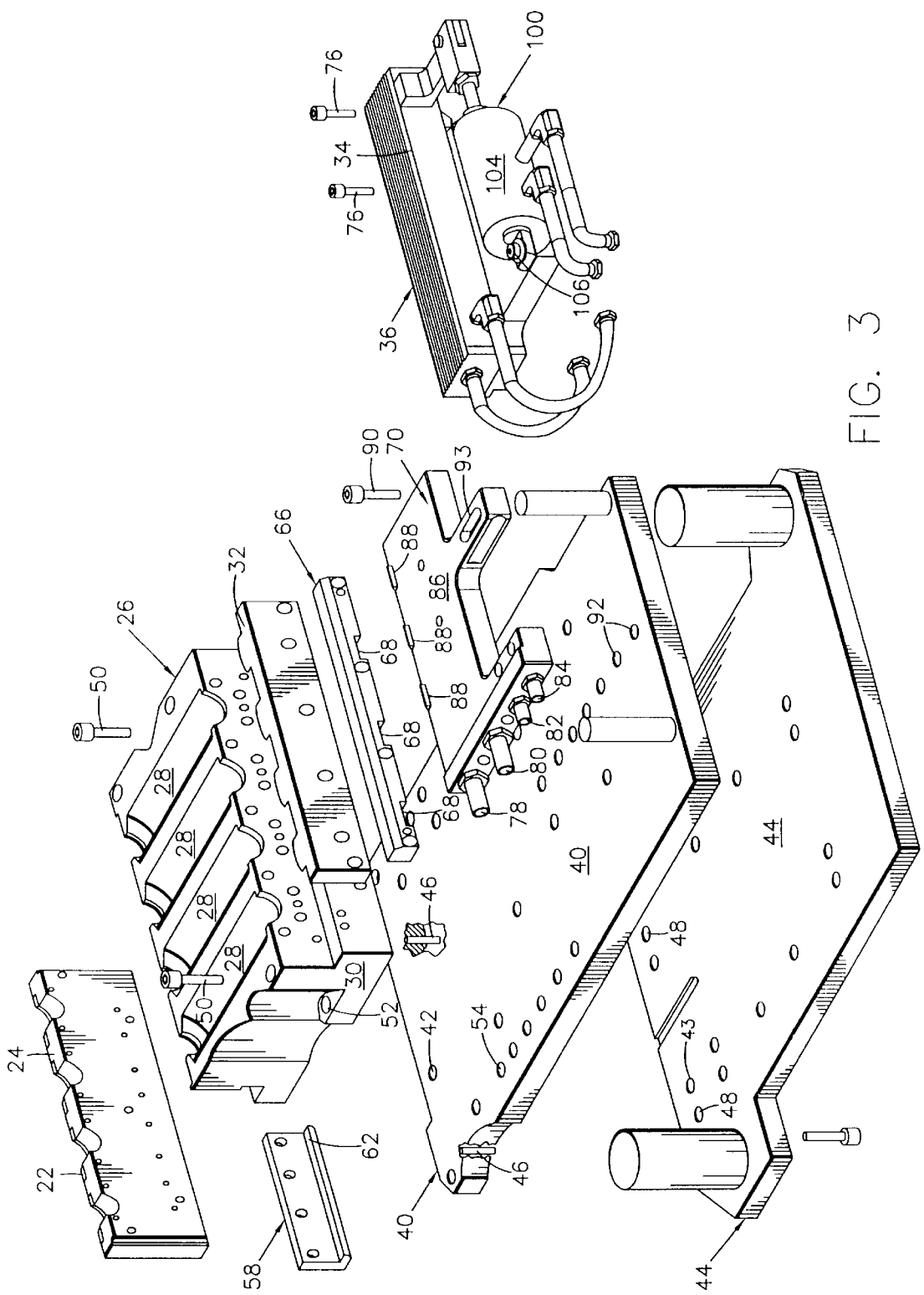
FIG. 3 is an isometric exploded view, partly broken away, of the apparatus of FIG. 1A.

By virtue of the above described structure, once the subplate 40 is attached to the machine, a procedure known as "lining out," which involves the leveling and centering of a mold set or mold unit 26 to the machine, is eliminated for any subsequent mold changes, thus effecting significant savings of both time and effort during such subsequent mold changes. It also will be appreciated that once the subplates are attached as universal standard components to different machine platens, the custom features that normally separate the different machines is thus eliminated, and mold sets are then readily interchanged among different extrusion blow molding machines. A plurality of different mold units 26 thus are interchangeably attachable with each mold unit 26 in a predetermined leveled and centered operating position on the standard subplate 40 which establishes a preselected, precisely aligned relation between the mold unit 26 and the machine platen 44. As shown in FIG. 3, quick and easy installation is assured by readily securing each mold unit 26 simply by a pair of machine fasteners 50,50 which pass through openings such as at 52 in the mold body 30 and into a pair of preselected matching threaded openings such as at 54 in the standard subplate.

For ease in mounting a heavy mold unit 26 on the standard subplate 40, the subplate is provided with a channel 56 extending along an upper edge for receiving an arm 58 projecting from an upper portion of the mold body 30. The arm 58 is secured by suitable fasteners 60 to the mold body 30 (shown in broken lines in FIG. 8) and is provided with a depending cleat 62 engageable with an interior surface 64 of a front wall of the subplate channel 56 for temporarily supporting the mold body 30 during its installation on the standard subplate 40 and prior to flush mounting the mold body 30 in surface-to-surface engagement with the subplate 40. To precisely align the mold body 30 with the subplate 40, suitable alignment means such as the pins 46 (FIG. 3) may be secured to project from the mold body surface confronting the subplate 40 in precision registration with a matching subplate opening as shown in the exploded view of FIG. 3.

Fixed to and extending along a lower rear portion of the mold body 30 (FIG. 6) is a hinge bar or locking bar 66 having longitudinally extending grooves 67 therein (FIGS. 6A and 6B) and three relieved sections such as at 68 in communication with a groove 67. The relieved sections 68 are shown as being equally spaced apart along the bottom 69 of the locking bar 66. A pair of water passages (not shown) are provided in the mold body 30 for receiving coolant water with terminal openings 71 formed in a bottom face 73 of the mold body 30 and offset to the rear of its locking bar 66. These openings 71 will be understood to be registrable with a pair of corresponding passages formed in a water manifold 70. Both the mold body openings 71 and the water manifold openings shown at 72 have suitable o-ring seals such as at 74 which are uniformly spaced apart in each mold body 30 and the water manifold 70 to effect a matching water tight connection between these two parts when the water manifold 70 is properly installed on the standard subplate 40, whereby the water manifold 70 delivers all required coolant water to the blow mold body 30.

Piggyback mounted on the water manifold 70 is the detabber 36 which is preferably secured by a pair of machine fasteners 76,76 directly to the water manifold 70. Thus, in accordance with another feature of this invention, the water manifold 70 and detabber 36 are combined as a one-piece component removably mountable on each of the different mold units 26 as a unitary standard assembly 77. Fluid connections such as water inlet and outlet lines 78,80 and air inlet lines 82,84 are provided for communicating respectively the water manifold 70 and detabber 36 with water and air supply sources, not shown, and the fluid connections are maintained without being disconnected during detachment of the standard assembly 77 from the mold unit 26 for expediting a mold change.

Figure 5A:
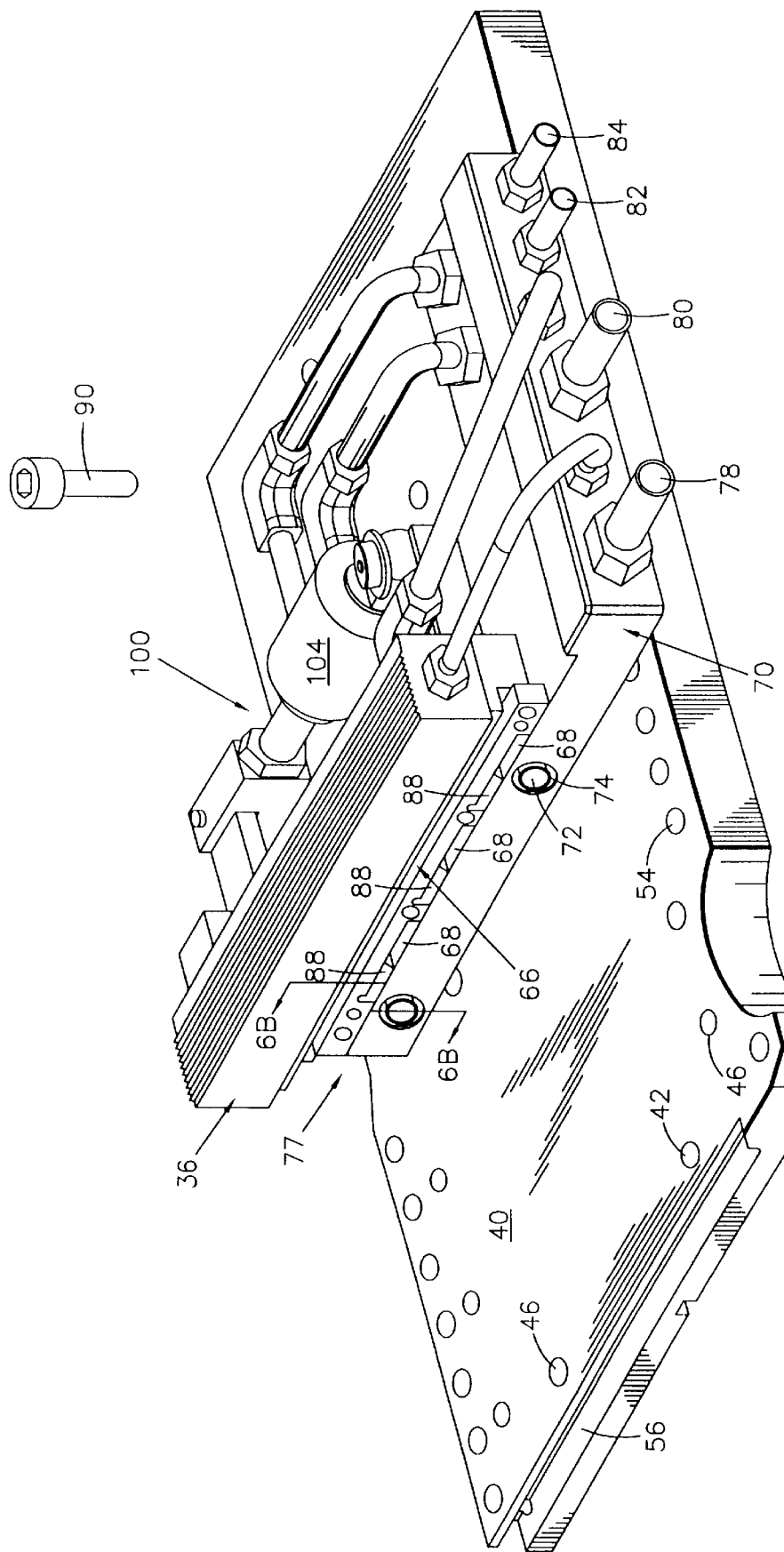
FIGS. 5A–5D are isometric views, partly broken away, similar to FIG. 4 and illustrating removal of the standard water manifold and detabber assembly from the universal standard subplate in a sequence of discrete steps.
Figure 5B:
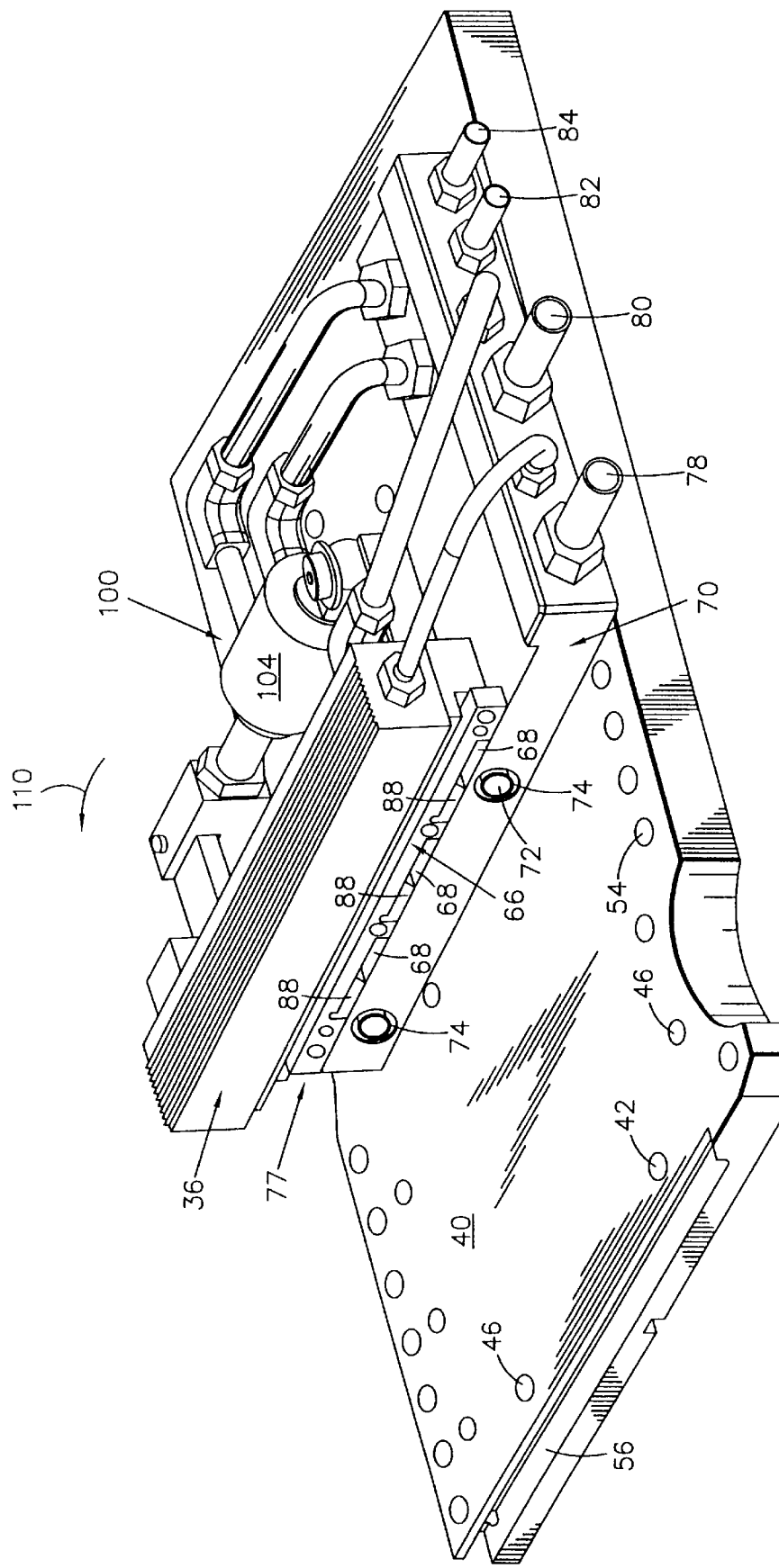
Figure 5C:
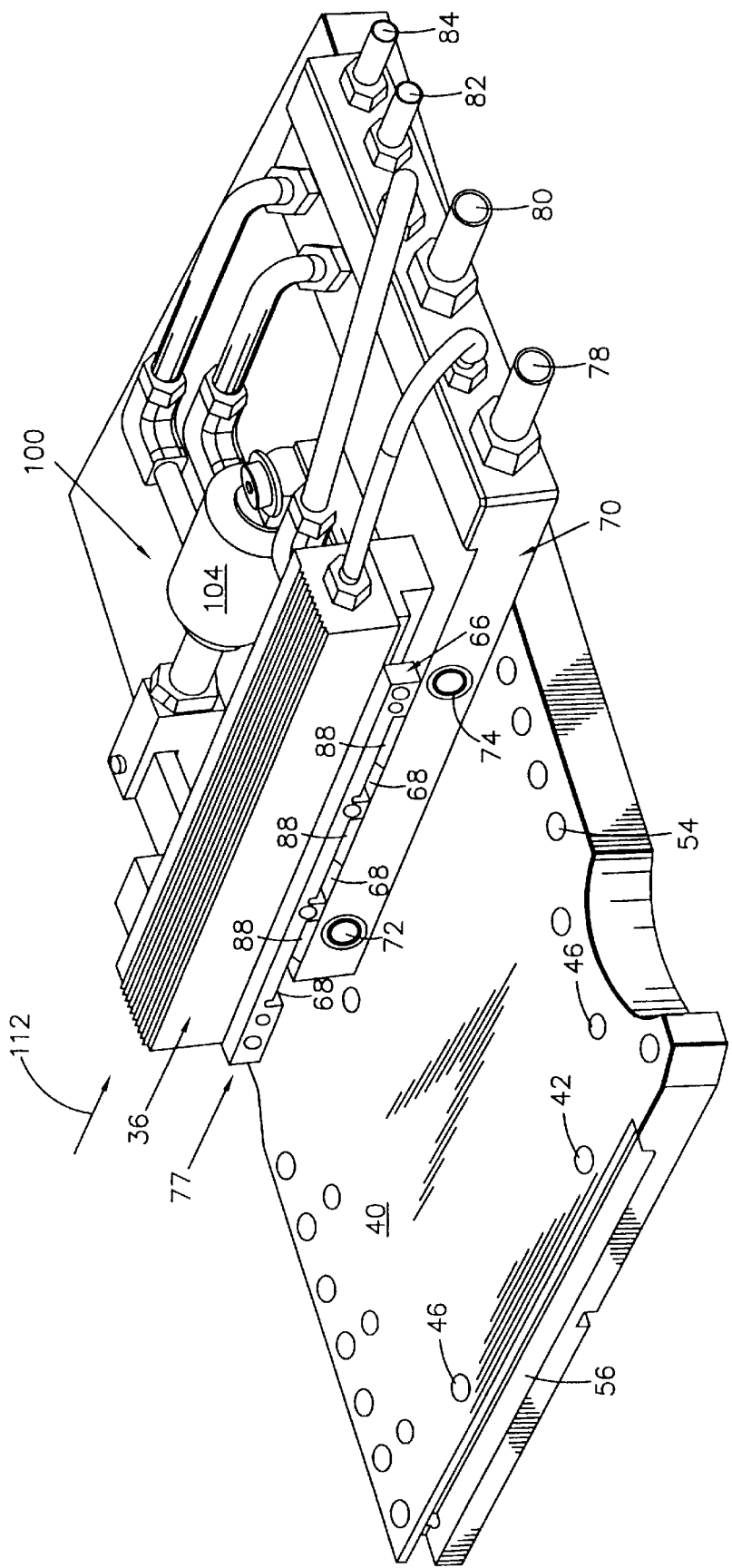
Figure 5D:
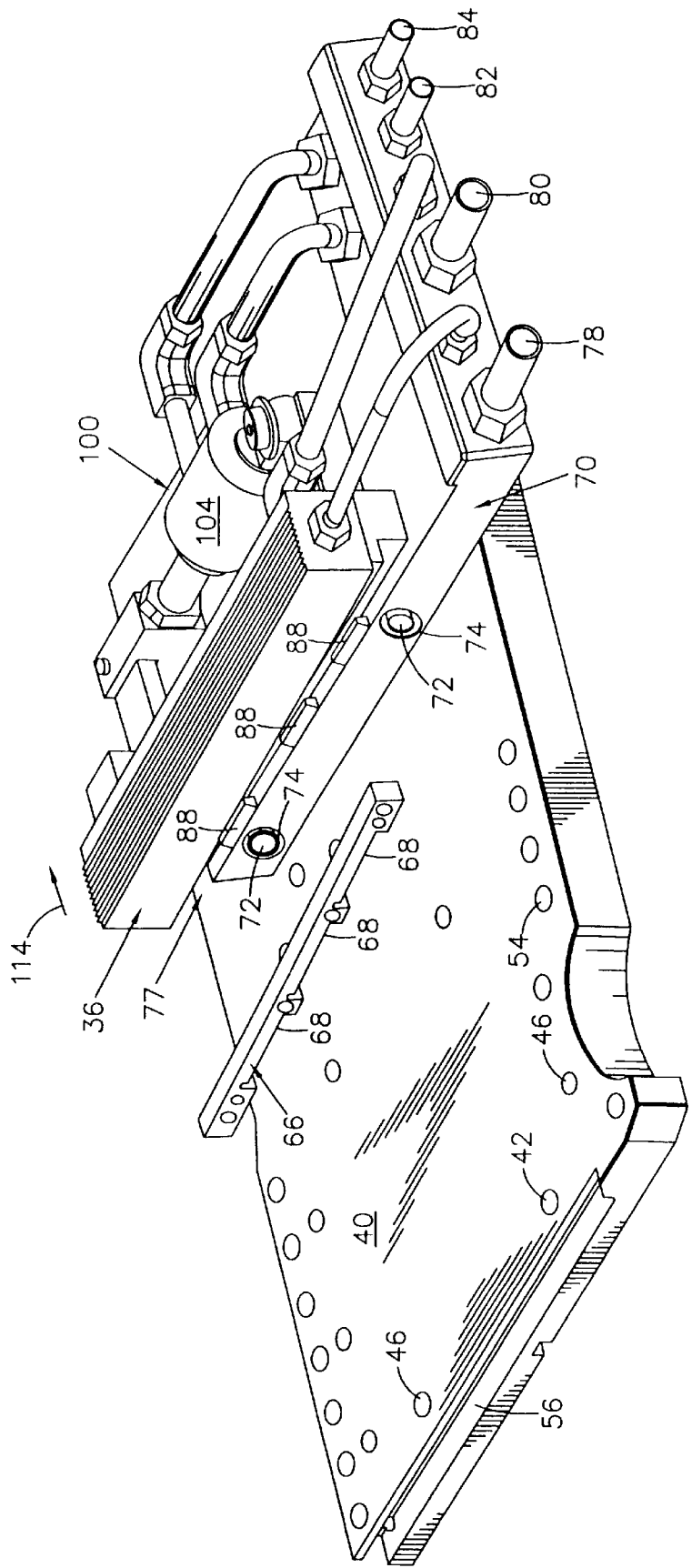
Figure 7B:
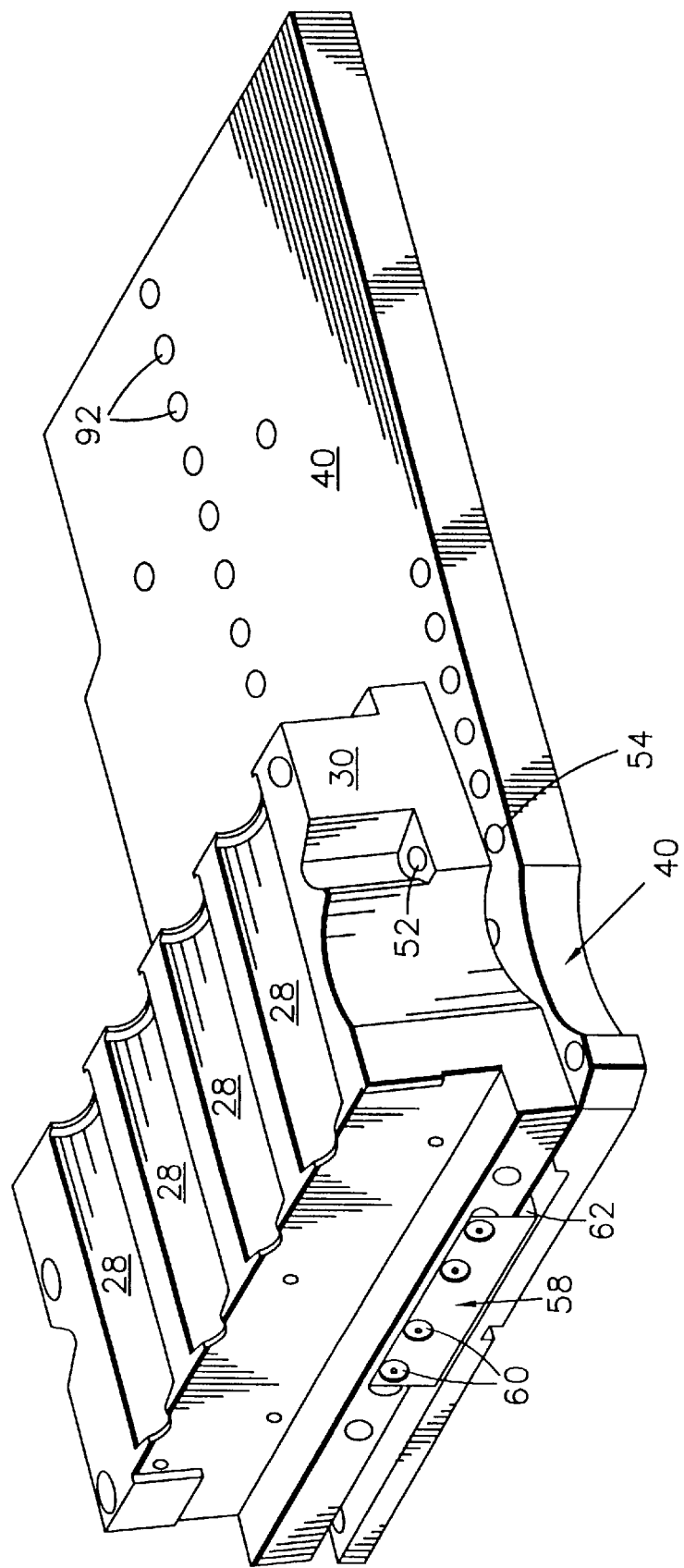
Figure 7C:
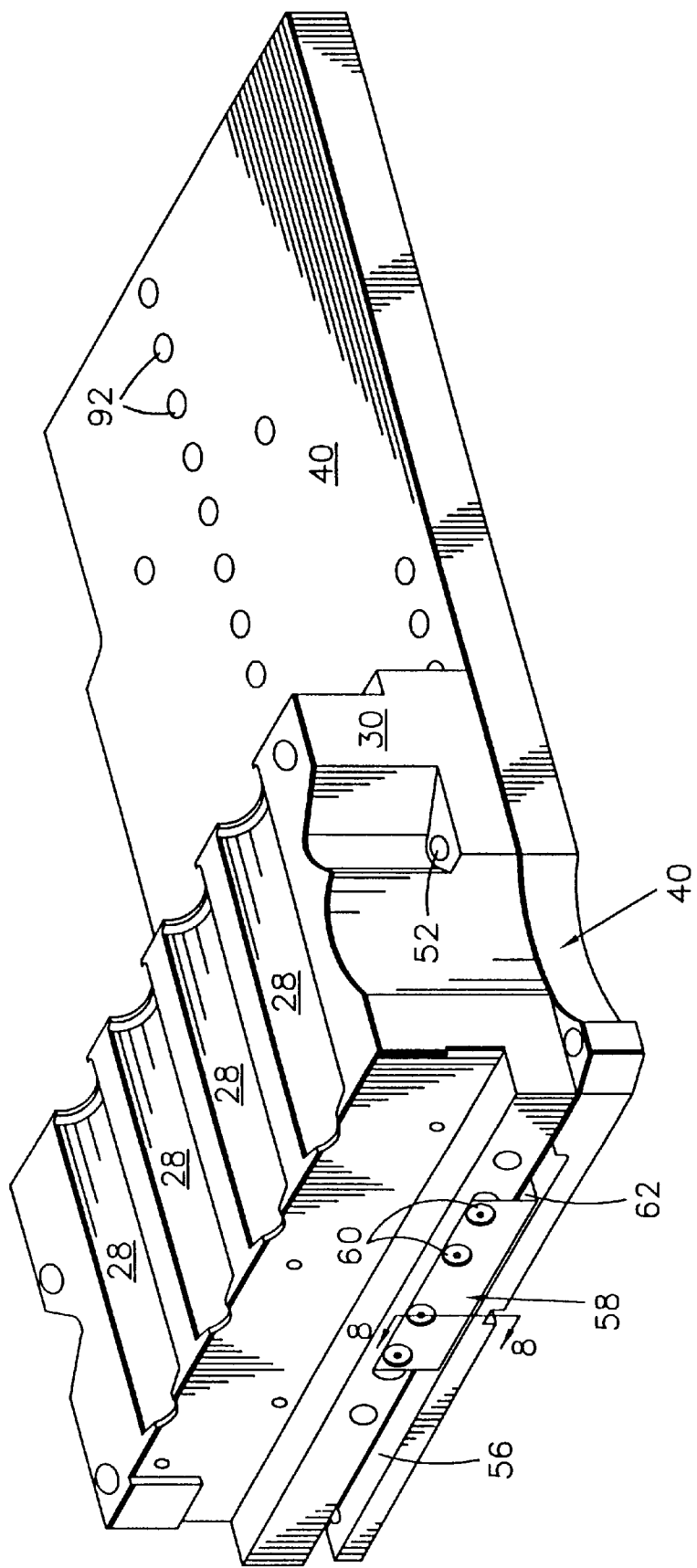

For ease in mounting and removing the unitary standard assembly 77 relative to the mold unit 26, a front face 86 of the water manifold 70 is shown formed with three integral dovetail projections at 88 (best seen in FIGS. 3 and 5D) equally spaced apart along an upper portion of the water manifold 70 for registration with the three relieved sections 68 (FIG. 3) and for reciprocal sliding movement within the grooves 67 of the locking bar 66. With the standard assembly 77 angularly disposed, say, at about 8° relative to the subplate 40 and with the dovetail projections 88 aligned with the relieved sections 68 of the locking bar 66 within its groove 67, the water manifold 70 and the piggyback-mounted detabber 68 then are laterally moveable as a unit sideways to the right (as viewed in FIG. 3 in the drawing). Once the dovetail projections 88 engage interior portions such as at 89 (FIG. 6A) of the locking bar 66 serving as stops, the standard assembly 77 may be pivoted downwardly into surface-to-surface engagement with the subplate 40, and the o-rings such as at 74 of the water passage openings 72 of the water manifold 70 and mold body 30 automatically register with one another in a fluid tight sealing action. Thereafter, the unitary standard assembly 77 is readily secured in operating position by means of a single machine fastener 90 which extends through an opening 93 in the water manifold 70 for engagement with a selected threaded opening 92 in the subplate 40. To accommodate different size mold units 26 being attached to the standard subplate 40, the opening 93 in the water manifold 70 is of elongated configuration. Such construction permits the machine fastener 90 to threadably engage a selected one of different threaded openings 92 in the subplate properly aligned within the opening 93 in the manifold 70.

To optimize its use with a variety of different extrusion blow molding machines wherein the overall combined height of the mold unit 26 and standard assembly 77 is a factor, the detabber 36 of the standard assembly 77 is particularly designed for minimizing the working clearance requirements of the detabber 36 in a vertical direction. This is accomplished by the disclosed orientation of a detabbing drive means 100 for reciprocating the stripper bar 32 relative to the mold unit 26 along a path inclined at about 20° to the horizontal (as shown by arrow 102 in FIG. 9A) below the mold unit 26 to remove the tabs formed at the ends of the blow molded objects. More specifically, the drive means includes a double-acting power cylinder 104 mounted on the detabber 36 in a generally horizontally disposed orientation for pivoting movement about an axis defined by pin 106 perpendicular to the stripper bar path of movement 102. Accordingly, the overall vertical clearance requirements of the detabber 36 is minimized to permit its use with a wide variety of different blow molding machines and to additionally provide for an improved side-pull detabbing motion as depicted in sequential steps shown in FIG. 9A through FIGS. 9B and 9C wherein the detabber stripper bar 34 is shown moving from its operative tab-engaging position in FIG. 9A to its remote tab-stripped position in FIG. 9C.

By virtue of the above described structure, it will be noted that the water manifold 70 and detabber 36 are first assembled and then simultaneously installed as a one-piece assembly 77 on a selected mold unit 26 and are simultaneously removable from that mold unit 26 as a one-piece assembly 77.

As best seen in FIGS. 5A–5D, disassembly for mold changeover is expeditiously accomplished by simply removing the single machine bolt 90 and then with an upward pivotal movement in the direction of arrow 110 (FIG. 5B) of the unitary standard assembly 77 of about 8° about the locking bar 66, and a subsequent lateral or sideways movement within the locking bar grooves 67 to the left (as shown by arrow 112 in FIG. 5C in the drawings), the connections provided by o-ring seals 74 between the water manifold 70 and mold body 26 are broken and the dovetail projections 88 on the manifold 70 are brought into alignment with the relieved sections 68 of the locking bar 66. The water manifold unit 70 and detabber unit 36 are then readily removed simultaneously as one-piece by withdrawing this standard assembly 77 downwardly along the subplate 40 in the direction of arrow 114 (FIG. 5D), thereby disconnecting the dovetail projections 88 on the water manifold 70 from their complementary grooves 67 and relieved sections 68 of the locking bar 66 on the mold unit 26. The fluid connections for communicating respectively with the water and air supply sources of the water manifold 70 and detabber 36 are conveniently maintained attached without being disconnected during detachment of the standard assembly 77 from the mold unit 26 during a mold change. Thus, disassembly of one of the mold units 26 from the machine platen 44 for effecting a changeover to a different mold unit on that machine platen is further expedited without having to once again precisely align the next mold unit relative to the machine platen. Such alignment is automatically achieved upon installation of the next mold unit 26 on the standard subplate 40 which establishes a preselected, precisely aligned relation between the mold unit 26 and the machine platen 44.

As previously noted, mold changeover in a conventional installation may take as long as three hours. The provision of the subplate 40 as a universal standard component for use with different blow molding machines, when coupled with the disclosed standard one-piece water manifold and detabber assembly 77 detachably mounted on a mold unit 26 by means of the disclosed quick release locking device 66,88, has been found to reduce the required time to remove one mold set from a preinstalled standard subplate and attach a new mold set to approximately forty minutes. Moreover, yet further cost savings are provided by the disclosed use of a universal standard subplate and standard water manifold and detabber assembly with a plurality of different mold units, thus providing manufacturing cost savings and further reducing unnecessary duplication of component parts in accordance with this invention.

Although this invention has been illustrated and described with respect to the disclosed exemplary embodiment thereof, it should be understood by those skilled in the art that various changes, omissions and additions may be made without departing from the spirit and scope of the invention.

We claim:

1. A quick change system for interchanging mold units on platens of different plastic extrusion blow molding machines and comprising
- a subplate dimensioned and configured for use with different blow molding machines as a universal standard component,
- the standard subplate being permanently secured to a platen of a blow molding machine in predetermined precision alignment with the machine platen,
- a plurality of different mold units interchangeably attachable to the standard subplate with each mold unit in a predetermined leveled and centered operating position on the standard subplate, the standard subplate establishing a preselected, precisely aligned relation between the mold unit and the machine platen, and
- an assembly including a water manifold and a detabber removably mountable on each of the different mold units as a unitary standard assembly.

2. A quick change system for interchanging mold units on platens of different plastic extrusion blow molding machines and comprising
- a subplate dimensioned and configured for use with different blow molding machines as a universal standard component,
- the standard subplate being permanently secured to a platen of a blow molding machine in predetermined precision alignment with the machine platen,
- a plurality of different mold units interchangeably attachable to the standard subplate with each mold unit in a predetermined leveled and centered operating position on the standard subplate, the standard subplate establishing a preselected, precisely aligned relation between the mold unit and the machine platen, and
- a unitary standard assembly for use with different mold units, the standard assembly having a water manifold for supplying coolant water to a mold unit of the blow molding machine and a detabber, the detabber being mounted on the water manifold, the water manifold and detabber being simultaneously installed as a one-piece assembly on a selected mold unit and being simultaneously removable from the mold unit as a one-piece assembly.

3. A quick change system for interchanging mold units on platens of different plastic extrusion blow molding machines and comprising
- a subplate dimensioned and configured for use with different blow molding machines as a universal standard component,
- the standard subplate being permanently secured to a platen of a blow molding machine in predetermined precision alignment with the machine platen,
- a plurality of different mold units interchangeably attachable to the standard subplate with each mold unit in a predetermined leveled and centered operating position on the standard subplate, the standard subplate establishing a preselected, precisely aligned relation between the mold unit and the machine platen,
- an arm projecting from and extending horizontally along an upper portion of each mold unit, and
- an arm-receiving channel extending horizontally along an upper edge of the standard subplate, the arm being received within the channel for temporarily supporting the mold unit during its installation on the standard subplate.

4. The system of claim 1 wherein the standard assembly has fluid connections for communicating the water manifold and the detabber respectively with water and air supply sources, the fluid connections being maintained without being disconnected during detachment of the standard assembly from a mold unit for expediting a mold change.

5. The system of claim 1 wherein the mold units and water manifold have quick release locking means thereon for removably mounting the standard assembly on each mold unit.

6. The system of claim 5 wherein the quick release locking means includes a locking bar with a groove and relieved dovetail-receiving sections therein on one of the standard assembly and mold unit members and complementary dovetail means on the other of the standard assembly and mold unit members for removably mounting the standard assembly and mold unit in secured relation to one another.

7. The system of claim 5 wherein the standard assembly, upon being secured to the mold unit by the locking means, is releasably fixed to the standard subplate by a machine fastener.

8. The system of claim 2 wherein the water manifold and detabber each have fluid connections for communicating respectively with water and air supply sources and which may be maintained without being disconnected during detachment of the unitary standard assembly from a mold unit during a mold change, and wherein the water manifold and each mold unit have corresponding fluid passages therein which register with one another when the unitary standard assembly is installed on each mold unit.

9. The system of claim 2 further including quick release locking means for removably mounting the unitary standard assembly on each mold unit.

10. The system of claim 1 wherein the standard assembly is mounted below the mold unit, and wherein the detabber includes a stripper bar and drive means for reciprocably moving the stripper bar relative to the mold unit along a path inclined to the horizontal below the mold unit to remove a tab formed at a bottom of a blow molded object, the drive means including a double-acting power cylinder mounted on the detabber in a generally horizontally disposed orientation for pivoting movement about an axis perpendicular to the stripper bar path of movement, thereby minimizing the overall depth of the detabber and providing a side pulling detabbing motion.

* * * * *